United States Patent [19]
Allaben, Jr.

[11] 3,917,425
[45] Nov. 4, 1975

[54] SHAFT LOCK DEVICE

[75] Inventor: Charles M. Allaben, Jr., Ithaca, N.Y.

[73] Assignee: Borg-Warner Corporation, Chicago, Ill.

[22] Filed: Dec. 20, 1973

[21] Appl. No.: 426,857

Related U.S. Application Data

[62] Division of Ser. No. 331,137, Feb. 9, 1973, Pat. No. 3,825,312.

[52] U.S. Cl. ............................... 403/371; 308/236
[51] Int. Cl.² ........................................ B63Q 3/157
[58] Field of Search ............ 308/196, 236; 403/368, 403/369, 370, 371, 374

[56] References Cited
UNITED STATES PATENTS

| 718,376 | 1/1903 | O'Reilly | 308/236 |
| 2,017,123 | 10/1935 | Harbert | 403/374 |
| 2,680,633 | 6/1954 | Brown | 403/369 |
| 3,117,485 | 1/1964 | Jansen | 403/369 |
| 3,158,915 | 12/1964 | Olesen | 403/369 |
| 3,709,575 | 1/1973 | Howe, Jr. | 308/236 |
| 3,816,012 | 6/1974 | Hubbell | 403/369 |
| 3,822,790 | 7/1974 | Armour et al. | 403/371 |

Primary Examiner—Robert S. Ward, Jr.
Assistant Examiner—Richard A. Bertsch
Attorney, Agent, or Firm—Aubrey L. Burgess

[57] ABSTRACT

A relatively compact arrangement for locking power transmission parts, such as bearings, pulleys, gears, sprockets and the like to shafts which comprises a cylindrical portion of the part having an inside truncated conical surface surrounding the shaft and a sleeve having an exterior surface complementary to the inside conical surface of the part and a bore for the shaft whereby a wedging action caused by axially moving the sleeve relative to the part, the part is locked to the shaft.

4 Claims, 17 Drawing Figures

FIG. 9
FIG. 10
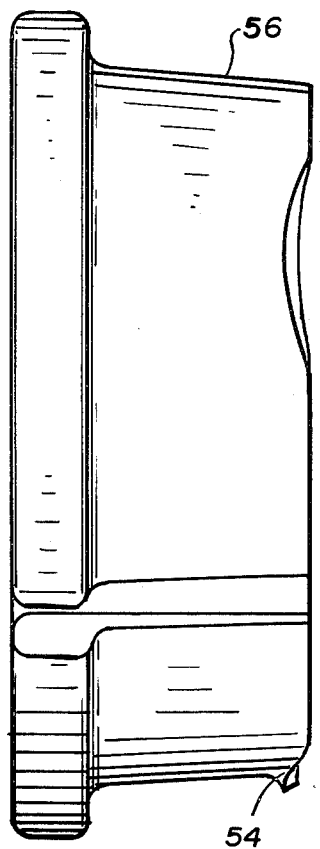
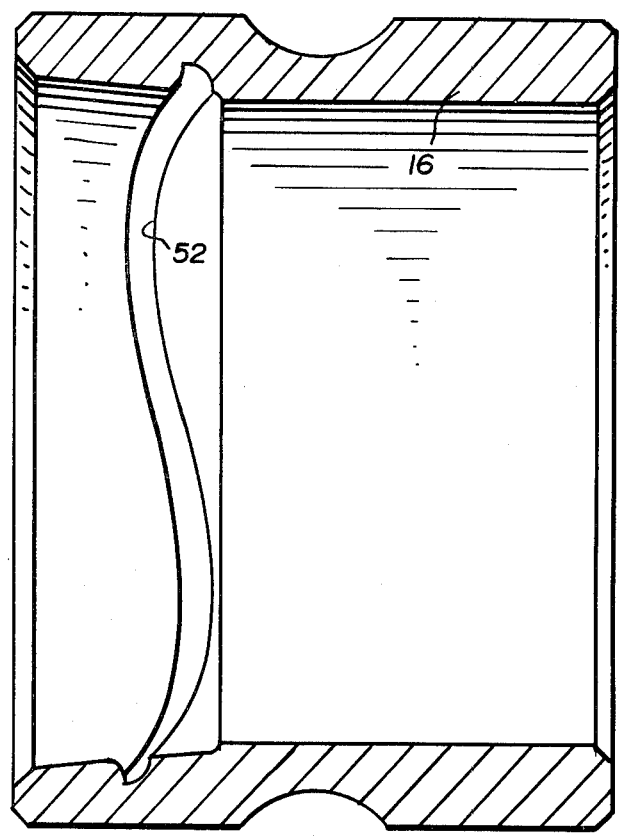
FIG. 13
FIG. 14
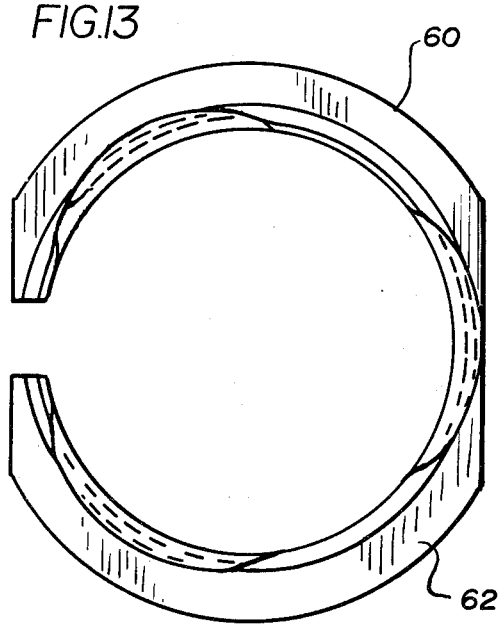
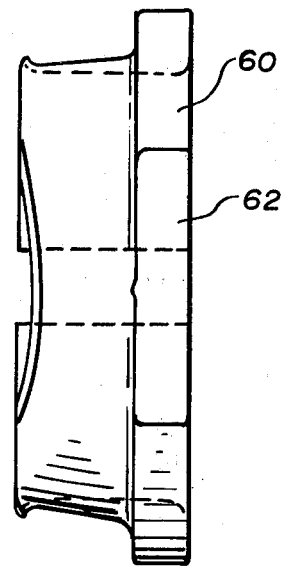

SHAFT LOCK DEVICE

This is a division of application Ser. No. 331,137 filed Feb. 9, 1973, now U.S. Pat. No. 3,825,312 issued July 23, 1974.

BACKGROUND OF THE INVENTION

There are many known arrangements for locking transmission parts, such as bearings, pulleys, gears, sprockets or the like to a shaft for rotation therewith. An ideal arrangement is an interference fit between the part and the shaft which is very difficult to assemble, especially in the case of long shafts. One of the simplest forms is the set-screw through the hub of the transmission part. Locking collars which are associated with extensions of the hub of the transmission part are also used, and, while more expensive than the simple set-screw arrangement, have been found to be more satisfactory than the simple set-screw arrangement, yet not ideal.

In any case, many of the known locking arrangements are such to cause the transmission part to be cocked or to be positioned off-center or to move with respect to the shaft.

The movement and/or misalignment of the part causes a condition known as fretting or fretting corrosion; a wearing away of parts of the assembly by mechanical as well as chemical action.

Set-screws cause burrs on the shaft. Fretting of sufficient magnitude may require the replacement of the shaft; burrs offer an obstruction during disassembly and assembly of the transmission parts.

The prior art arrangements just described require considerable time for locking and/or unlocking the transmission part to the shaft because of the screw arrangement.

Another more recent development in the shaft locking art is the use of a plurality of spring-like clips which are wedged between the transmission part and the shaft. These clips are relatively inexpensive but their disadvantages outweigh their advantages. It is difficult to center the part with respect to the axis of the shaft, so that misalignment and fretting corrosion occurs. Thus, replacement of a relatively expensive shaft may be a frequent necessity.

THE INVENTION

This invention uses a sleeve having a cylindrical bore with a conical outside configuration as a locking element. The sleeve may be axially split or provided with a plurality of slots, so that its effective diameter can be easily reduced when locking the part to the shaft. One end of the sleeve may be provided with one or more ears or outwardly turned parts to register with a retaining groove to keep the sleeve and the transmission part together prior to use and also to register with a serpentine or spiral-like groove in the transmission part, if such is provided, to provide the locking function. The sleeve or at least a part thereof, depending on its construction, is collapsed sufficiently to insert it into a portion of the transmission part, such as a bearing, sheave, pulley, gear, sprocket and the like, and expands by its natural spring action to its original bore, generally larger than the diameter of the shaft on which the part is to be mounted. The transmission part is provided with a portion having a bore to receive the shaft and at least one axial portion with a conical bore complementary to the conical outside configuration of the sleeve. To lock the part with the shaft, the sleeve is moved axially inwardly toward the part. When the serpentine or spiral-like groove is provided in the transmission part, this inward movement of the sleeve is accomplished by rotating the sleeve. The sleeve or a part thereof is collapsed and is wedged between the shaft and the conical bore of the part being locked to the shaft.

This locking arrangement attaches the transmission part to the shaft and centers its axis with the axis of the shaft to give a true concentric running condition. The off-center or out-of-balance created by the prior art locking arrangement is eliminated. The bore of the sleeve is such to provide an area contact with the shaft, so that no burrs are formed.

The angle of the conical surfaces is chosen to provide a self-locking arrangement. The critical angle is one whose tangent equals the coefficient of friction between the contacting surfaces. Angles smaller than this will be self-locking; larger angles will not be self-locking. The coefficient of friction will vary because of materials used, accuracy of fit, surface finishes, cleanliness of surfaces and absence or presence of and/or type of lubricant. Generally it has been found in most cases that a suitable angle is between approximately two and ten degrees, preferably about 4° or 5°.

Under severe loads and where a deflection of the shaft may occur, it is desirable to use a part constructed with the helical groove to receive one or more ears of the locking sleeve, as will be described.

An important feature of this invention is the fact that the locking arrangement is axially offset from the critical load bearing or rolling elements of the part and obviates the use of an interference fit between the shaft and the part while centering the axis of the part with the axis of the shaft.

THE DRAWINGS

FIGS. 9, 10, 11 and 12 are sectional views of another embodiment of this invention showing a locking sleeve, a transmission part and intermediate and locking positions of the elements;

FIGS. 13 and 14 are views of a locking sleeve similar to that in FIGS. 9 to 12 but of slightly different construction;

DETAILED DESCRIPTION

Figure 1:
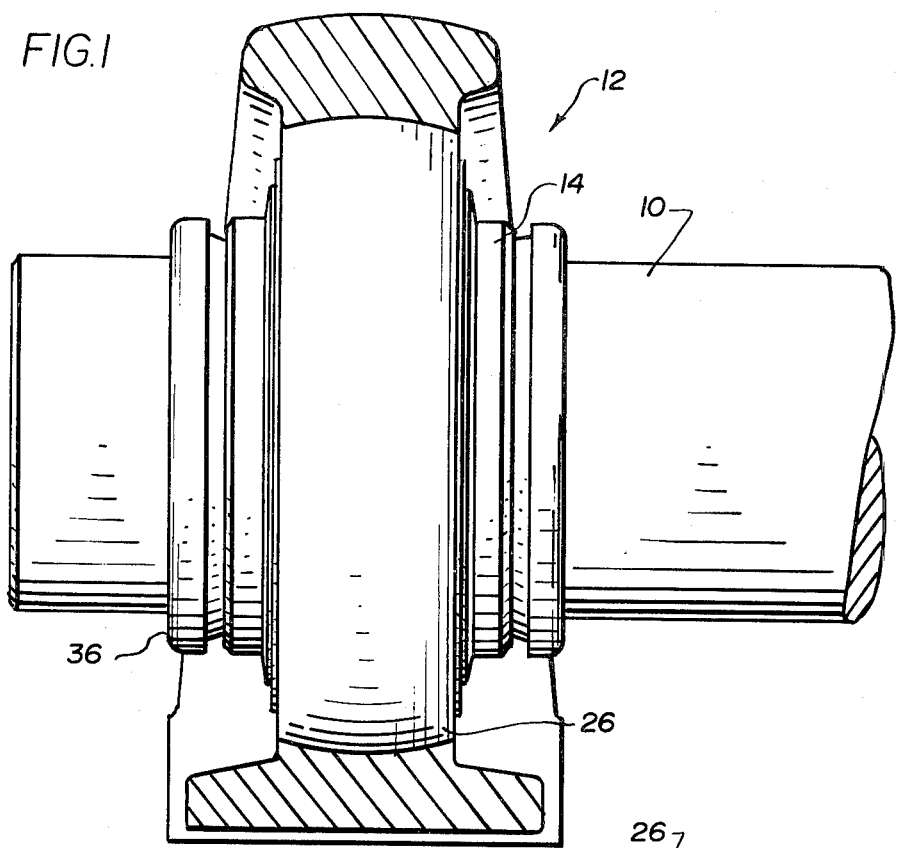
FIG. 1 is a partial sectional view of one form of locking arrangement according to this invention.
Figure 3:
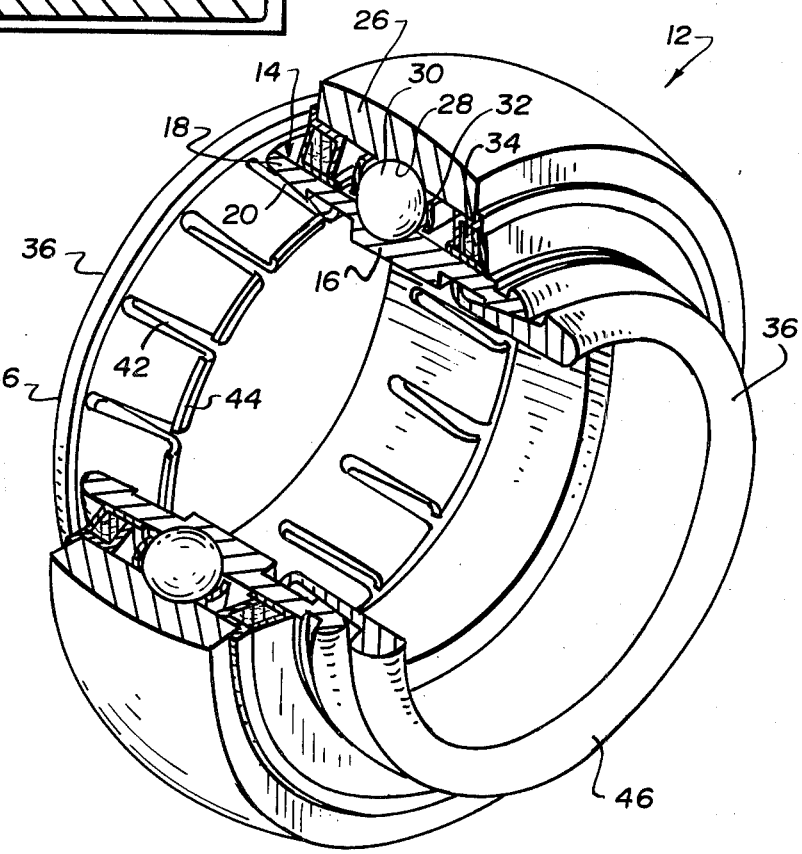
FIG. 3 is a perspective view, partially in section of the FIG. 1 locking arrangment.
Figure 2:
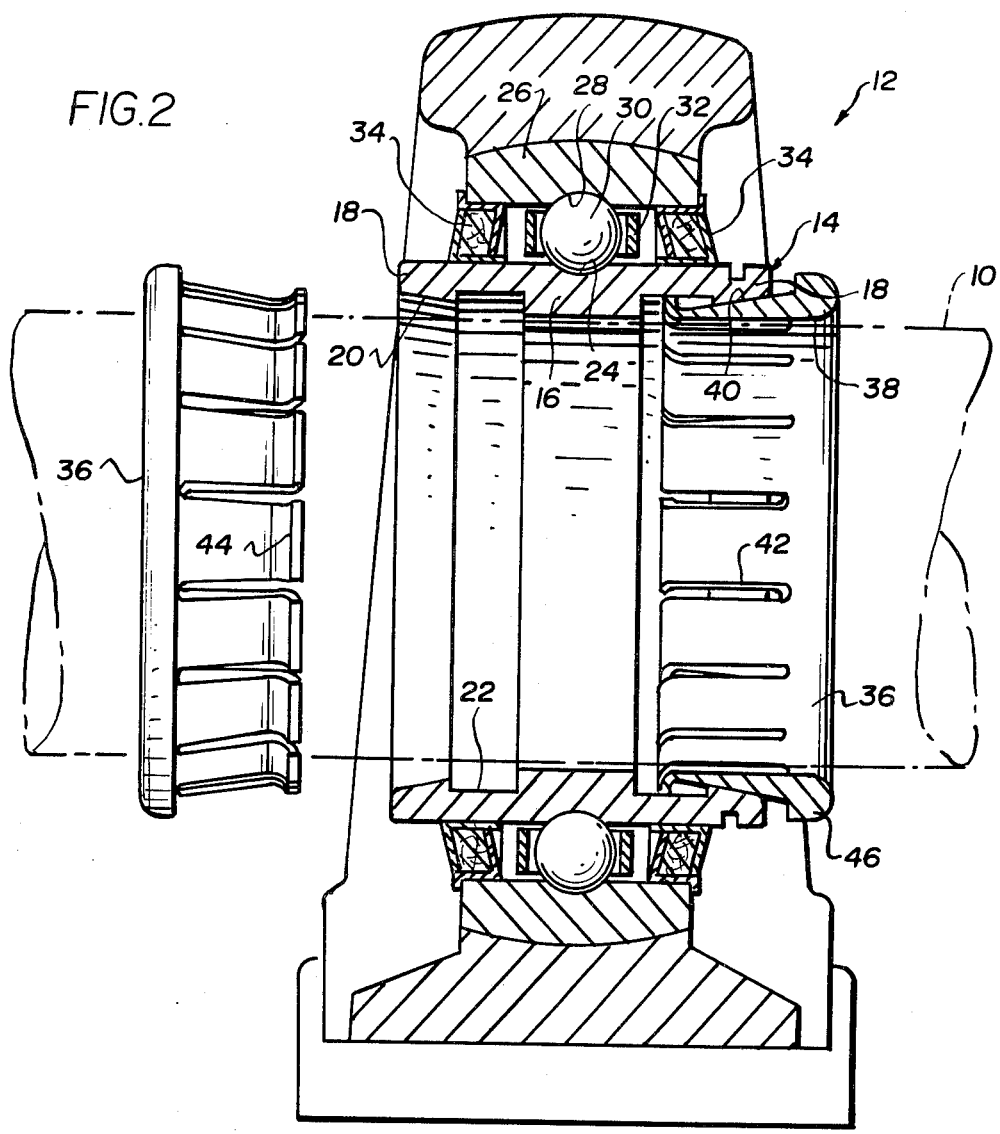
FIG. 2 is a partial sectional and exploded view of the FIG. 1 form of locking arrangement according to this invention as used with a ball bearing, showing the shaft in broken lines.

FIGS. 1 to 4 illustrate one embodiment of the invention, which for purposes of description is associated with a ball bearing. It is to be understood that the invention is applicable for use with other transmission parts, such as sheaves, pulley, sprockets, gears and the like. It is also applicable to other types of bearings.

In FIGS. 1 to 4, there is illustrated a shaft 10, on which is to be mounted and locked therewith for concurrent rotation about a common axis, a transmission part, generally identified as 12, which includes a cylindrical part 14. The cylindrical part 14 has a central portion 16 with an inside bore to surround the shaft 10 and axial portions 18, each with a conical inside surface 20. The surfaces 20 diverge outwardly, as illustrated, being angled to provide a locking taper. The specific angle is based on the coefficient of friction between the surfaces and depends on the materials used and other factors as before enumerated. The portions 18 are also provided, in the embodiment shown, with a cylindrical groove 22.

In the structure being described, the member 14 is the inner race of a bearing with a raceway 24 formed in the central portion 16. The bearing includes an outer race member 26 with a raceway 28 and a plurality of balls 30 disposed between the raceways 24 and 28. A retainer 32 holds the balls 30 in spaced relationship with one another, and appropriate edge seals 34 are provided to retain lubricant introduced between the races.

To lock the bearing or part 12 to the shaft 10, there are provided locking sleeves 36, each having a central cylindrical bore 38 and an outside conical surface 40 substantially complementary to the bore 20. In this embodiment, the locking sleeves 36 are slotted, as at 42, so that they may be inserted into the portion 18 and can be wedged into locking arrangement with the shaft 10 and the part 16. Also, the end of the sleeve is provided with outwardly turned portion or ears 44 to engage the groove 22 in order that the parts may be retained in an assembly during shipment. The opposite end of the sleeve may be provided with an enlarged portion 46 if desirable. In use, each sleeve 36 is moved axially inwardly to collapse the sleeve into locking engagement with the shaft 10 and the transmission part 12.

FIGS. 5, 6, 7 and 8 illustrate various modifications of the locking collar or sleeve identified here as 36A, 36B, 36C and 36D. The sleeves 36A and 36B differ mainly from the sleeve 36 in that the spacing of the slots 42 and/or the ears 44 is different. The sleeves 36C and 36D are split as at 50 and are not provided with slots, but are provided with ears 44 either in spaced relationship, as in FIG. 8, or as a continuous fashion as in FIG. 7. The split rings are collapsed for insertion into the transmission part and for locking engagement with the shaft and transmission part.

In the embodiment illustrated in FIGS. 9 to 12 inclusive, the transmission part 16 is provided with a serpentine groove 52 to receive ears 54 of a split sleeve 56. Otherwise the parts are the same. To lock the part 16 with the shaft, the sleeve 56 is rotated and thus moved axially inwardly to collapse the sleeve 56 into proper locking position. The sleeve 56 may be slotted instead of being split within the scope of this invention.

The sleeve 60 illustrated in FIGS. 13 and 14 is similar to the sleeve 56 in the FIGS. 9 to 12 embodiment but is provided with a flange 62 to receive a suitable wrench to rotate the sleeve and lock the parts together.

Figure 15:
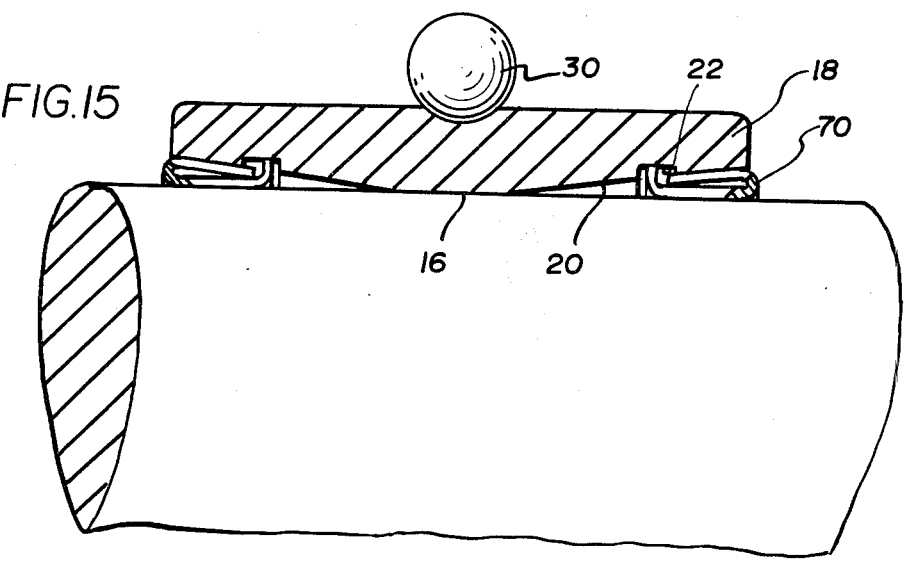
FIG. 15 is a partial sectional view of still another embodiment of this invention.
Figure 4:
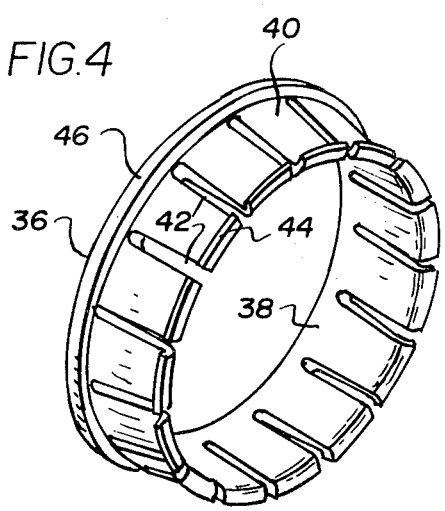
FIG. 4 is a perspective view of the locking sleeve of the FIG. 1 to 3 embodiment.
Figure 5:
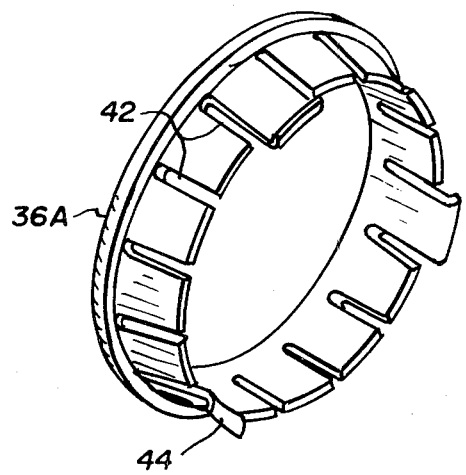
FIGS. 5, 6, 7 and 8 are perspective views of other embodiments of locking sleeves usable in place of the locking sleeve of FIGS. 1 to 4.
Figure 6:
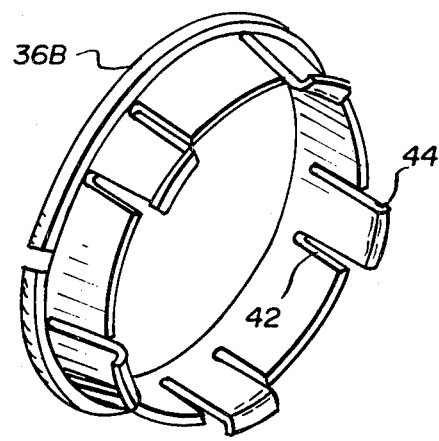
Figure 7:
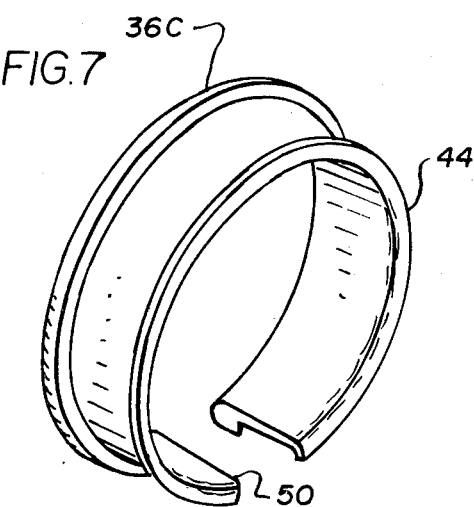
Figure 8:
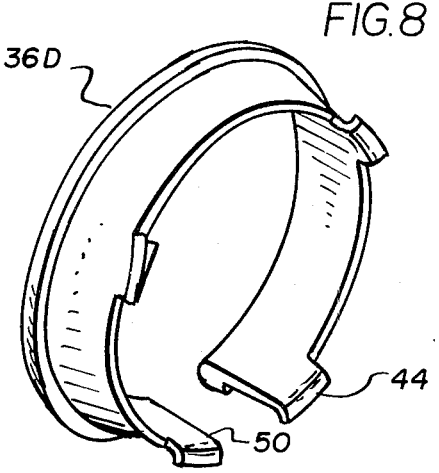
Figure 11:
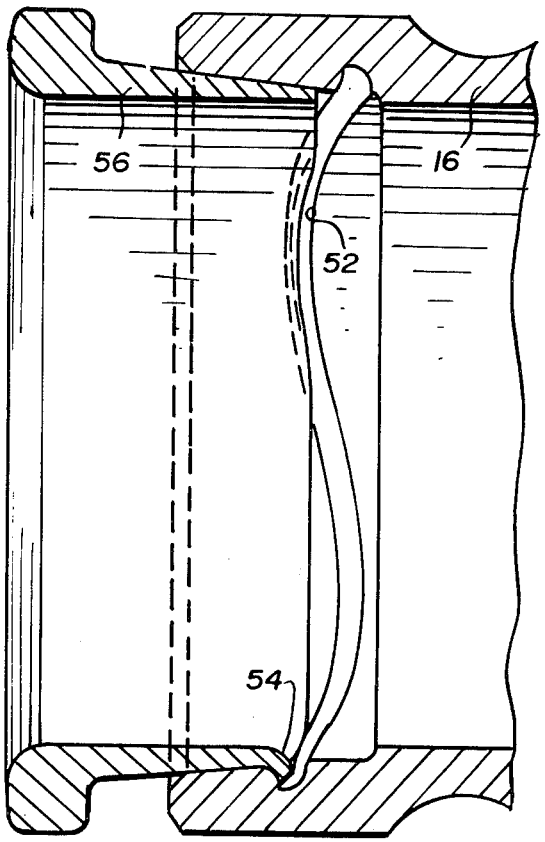
Figure 12:
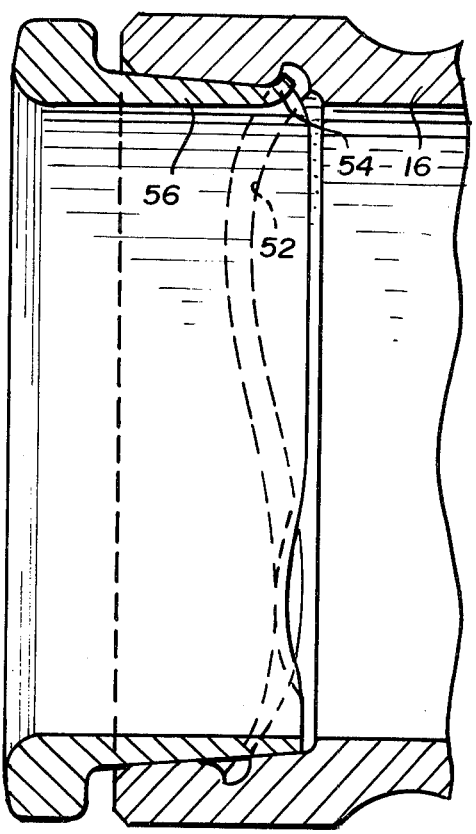

FIG. 15 illustrates a sleeve 70 formed of sheet metal or tubing. The operation of the sleeve is the same. The sleeve 70 can be constructed by bending a strip of sheet metal, so as to form a cylindrical bore, an outside conical surface and outwardly turned ears. If constructed of tubing, the tubing is shaped by a suitable die to the desired configuration, and either split or provided with slots, as in the previous embodiments.

Figure 16:
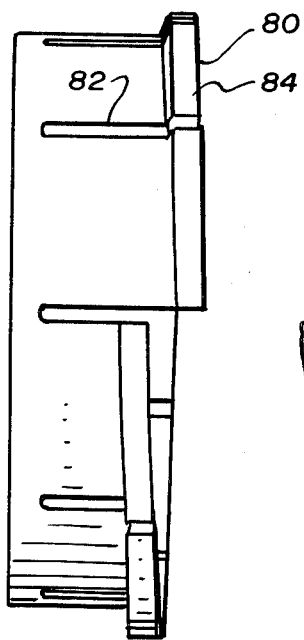
FIGS. 16 and 17 are illustrations of still another embodiment of the locking sleeve of this invention.
Figure 17:
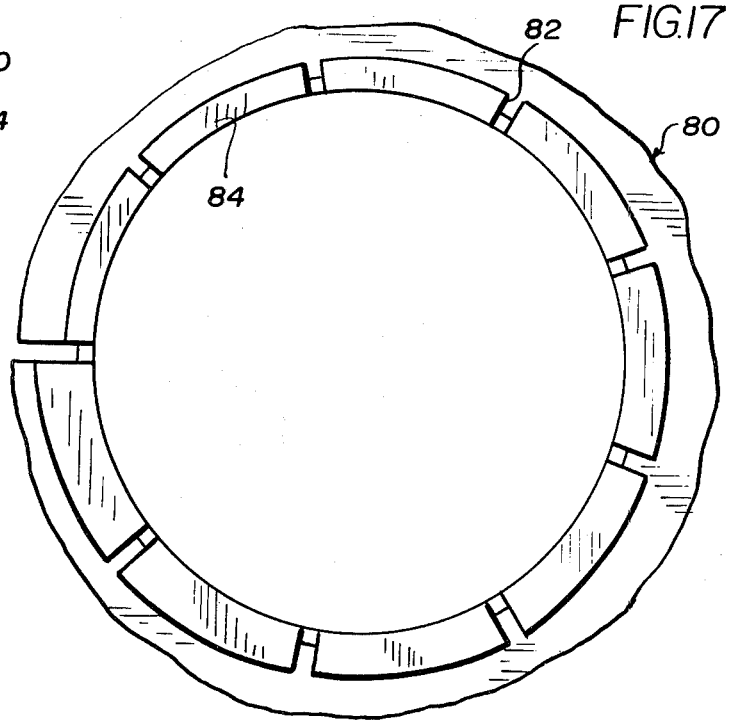

FIGS. 16 and 17 illustrate still another embodiment of a locking sleeve, identified as 80 which can be formed from metal stock or by any suitable method. The sleeve 80 is slotted as at 82 and is formed to have a helical, enlarged terminus 84 to engage a groove in a transmission part, so that upon rotation, the parts are wedged so as to lock the sleeve to the shaft.

I claim:

1. A shaft locking arrangement comprising:
   a cylindrical member having a first load bearing portion with an inside diameter to receive the shaft;
   at least one axial portion extending from said first portion and having an interior truncated conical surface spaced axially from said load bearing portion which conical surface converges with respect to said load bearing portion;
   a sleeve member received in said axial portion and having an inner diameter to receive said shaft;
   said sleeve member having an exterior truncated conical surface complementary to the conical surface of said axial portion;
   said sleeve member being movable axially with respect to said axial portion and toward said load bearing portion to wedge with said axial portion to lock said cylindrical member into engagement with said shaft for concurrent rotation therewith;
   means defining a groove in said axial portion intersecting said conical surface thereof; and
   an outwardly turned edge on said sleeve received in said groove when said sleeve is axially moved into locking position.

2. A shaft locking arrangement as recited in claim 1 in which said groove is serpentine so that said sleeve is moved axially by being rotated.

3. A shaft locking arrangement as recited in claim 1 in which said sleeve is axially split.

4. A shaft locking arrangement as recited in claim 1 in which said sleeve is provided with a plurality of axial slots.

* * * * *